US012585487B2

(12) United States Patent
Simeonov et al.

(10) Patent No.: US 12,585,487 B2
(45) Date of Patent: Mar. 24, 2026

(54) CANCELLATION OF A MIGRATION-BASED UPGRADE USING A NETWORK SWAP WORKFLOW

(71) Applicant: VMware LLC, Palo Alto, CA (US)

(72) Inventors: Tomo Vladimirov Simeonov, Sofia (BG); Ivaylo Radoslavov Radev, Sofia (BG); Vladimir Ivanov, Sofia (BG); Georgi Hristov, Sofia (BG); Grigor Harbaliev, Sofia (BG)

(73) Assignee: VMware LLC, Palo Alto, CA (US)

( * ) Notice: Subject to any disclaimer, the term of this patent is extended or adjusted under 35 U.S.C. 154(b) by 599 days.

(21) Appl. No.: 18/148,792

(22) Filed: Dec. 30, 2022

(65) Prior Publication Data

US 2024/0220300 A1      Jul. 4, 2024

(51) Int. Cl.
G06F 9/455 (2018.01)

(52) U.S. Cl.
CPC .. G06F 9/45558 (2013.01); *G06F 2009/4557* (2013.01); *G06F 2009/45595* (2013.01)

(58) Field of Classification Search
CPC ......... G06F 9/45558; G06F 2009/4557; G06F 2009/45595
USPC .......................................................... 718/1
See application file for complete search history.

(56) References Cited

U.S. PATENT DOCUMENTS

| | | | |
|---|---|---|---|
| 7,519,737 B2 * | 4/2009 | Naismith ................. | G05B 9/03 |
| | | | 700/5 |
| 9,146,769 B1 * | 9/2015 | Shankar .................. | H04L 67/10 |
| 9,244,676 B2 * | 1/2016 | Kamble .............. | G06F 9/45558 |
| 2013/0159487 A1 * | 6/2013 | Patel ................... | H04L 61/5007 |
| | | | 709/238 |
| 2019/0392150 A1 * | 12/2019 | Shevade ............ | H04L 61/2517 |
| 2020/0293352 A1 * | 9/2020 | Foley ...................... | G06F 9/452 |
| 2021/0349710 A1 * | 11/2021 | Kang ...................... | G06F 8/658 |

* cited by examiner

*Primary Examiner* — Jacob D Dascomb
(74) *Attorney, Agent, or Firm* — King Intellectual Asset Management

(57) ABSTRACT

A non-disruptive cancellation of a migration-based virtual machine (VM) upgrade uses a network swap workflow and may be performed without user involvement (e.g., without providing login credentials). A source machine and a target machine swap machine identities such that, for example, the target machine takes on the internet protocol (IP) address of the source machine and the source machine takes on the original IP address of the target machine. Upon a cancellation of the upgrade, the source machine and the target machine revert to their original machine identities, for example, by swapping machine identities again. In this manner, the target machine assumes the role of the source machine for the user if the upgrade is not canceled, and the source machine rapidly resumes its role for the user if there is a cancellation. Advantageously, fewer computing resources are required for this cancellation.

20 Claims, 12 Drawing Sheets

Figure 1:
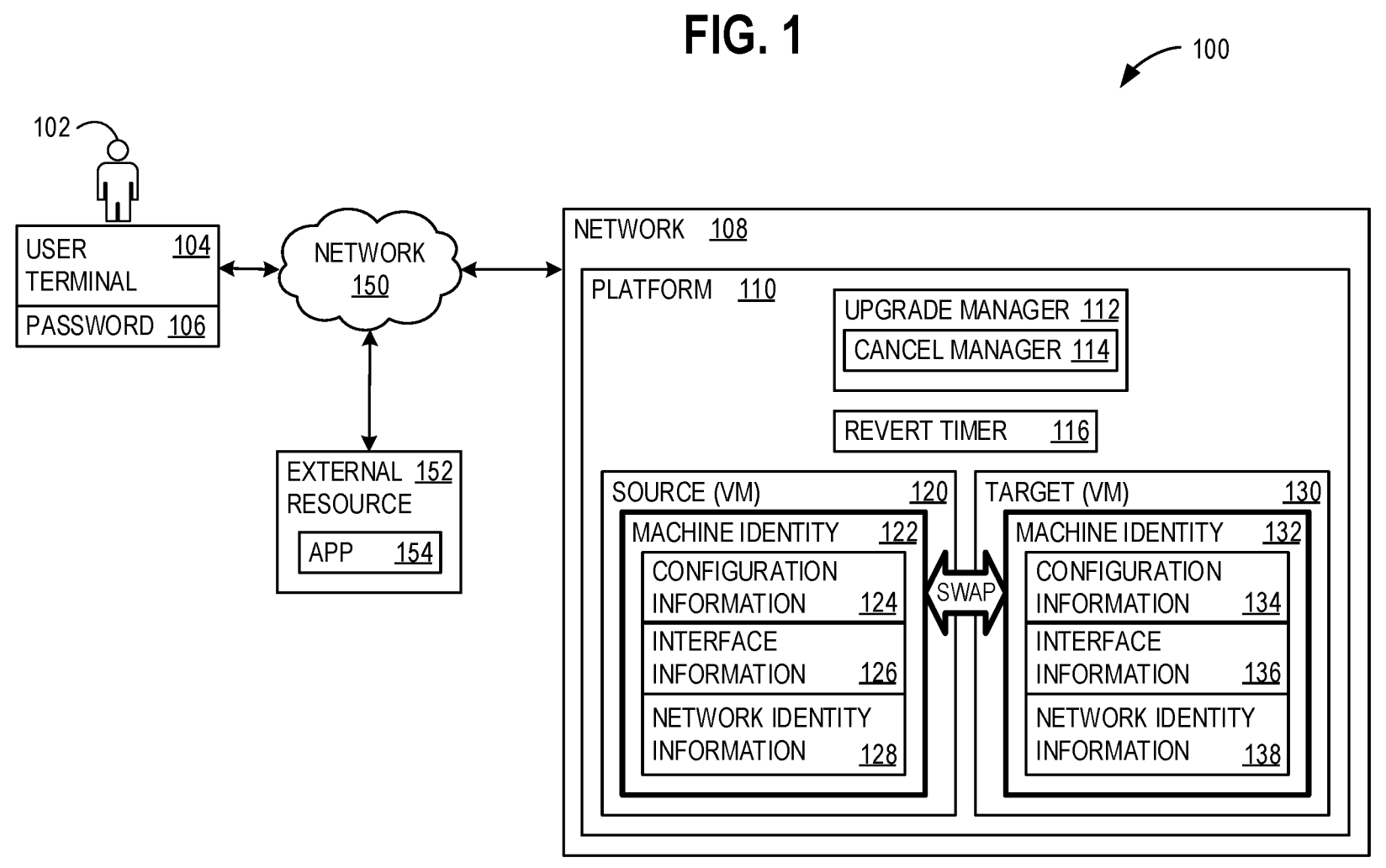

NETWORK   108

PLATFORM   110

UPGRADE MANAGER   112

CANCEL MANAGER   114

REVERT TIMER   116

SOURCE (VM)   120

MACHINE IDENTITY   122

CONFIGURATION INFORMATION   124

INTERFACE INFORMATION   126

NETWORK IDENTITY INFORMATION   128

SWAP

TARGET (VM)   130

MACHINE IDENTITY   132

CONFIGURATION INFORMATION   134

INTERFACE INFORMATION   136

NETWORK IDENTITY INFORMATION   138

NETWORK 150

EXTERNAL   152
RESOURCE

APP   154

102

USER TERMINAL   104

PASSWORD   106

Figure 2:
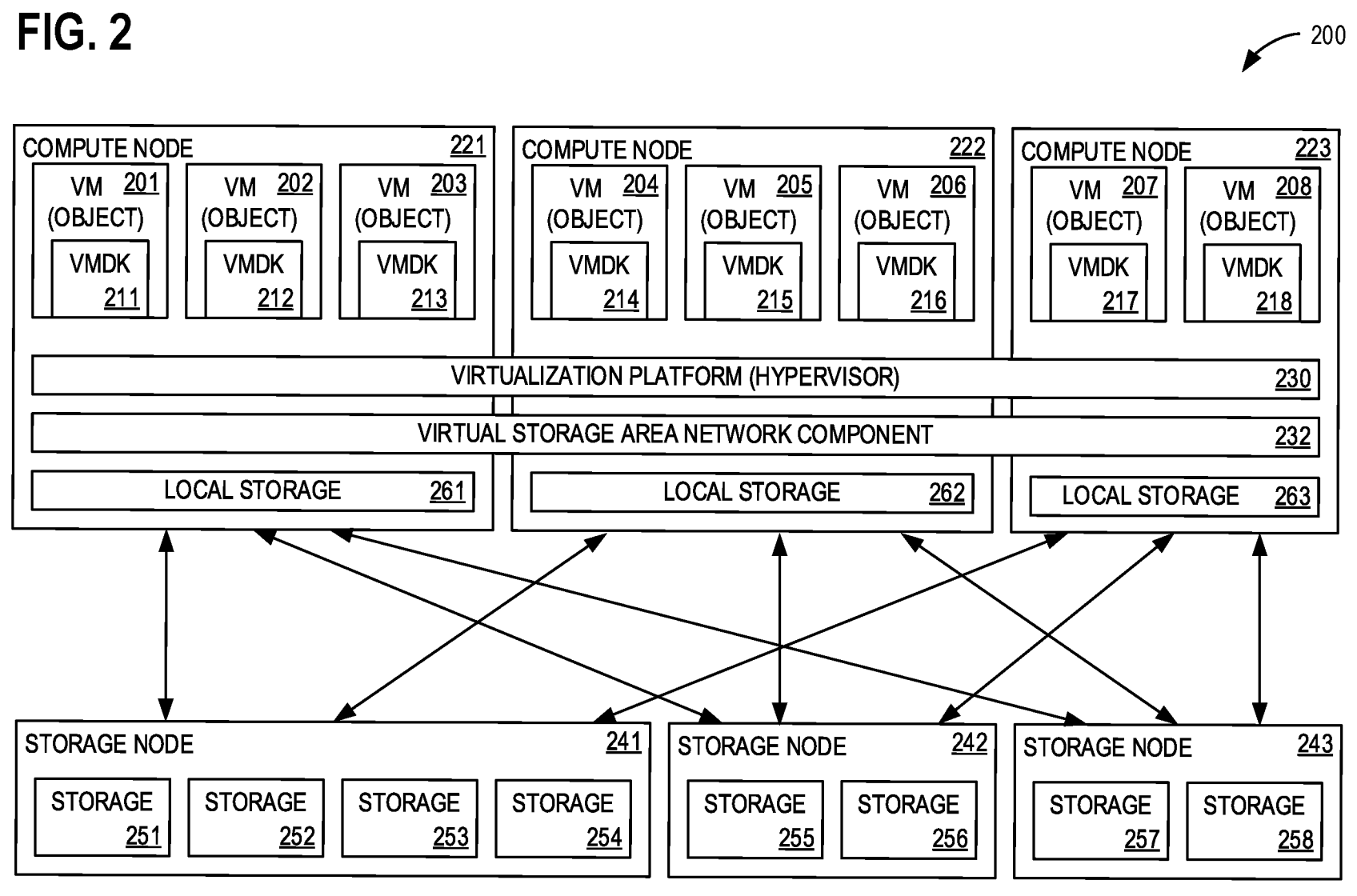

COMPUTE NODE 221

VM 201 (OBJECT)
VMDK 211

VM 202 (OBJECT)
VMDK 212

VM 203 (OBJECT)
VMDK 213

COMPUTE NODE 222

VM 204 (OBJECT)
VMDK 214

VM 205 (OBJECT)
VMDK 215

VM 206 (OBJECT)
VMDK 216

COMPUTE NODE 223

VM 207 (OBJECT)
VMDK 217

VM 208 (OBJECT)
VMDK 218

VIRTUALIZATION PLATFORM (HYPERVISOR) 230

VIRTUAL STORAGE AREA NETWORK COMPONENT 232

LOCAL STORAGE 261

LOCAL STORAGE 262

LOCAL STORAGE 263

STORAGE NODE 241

STORAGE 251

STORAGE 252

STORAGE 253

STORAGE 254

STORAGE NODE 242

STORAGE 255

STORAGE 256

STORAGE NODE 243

STORAGE 257

STORAGE 258

FIG. 4A

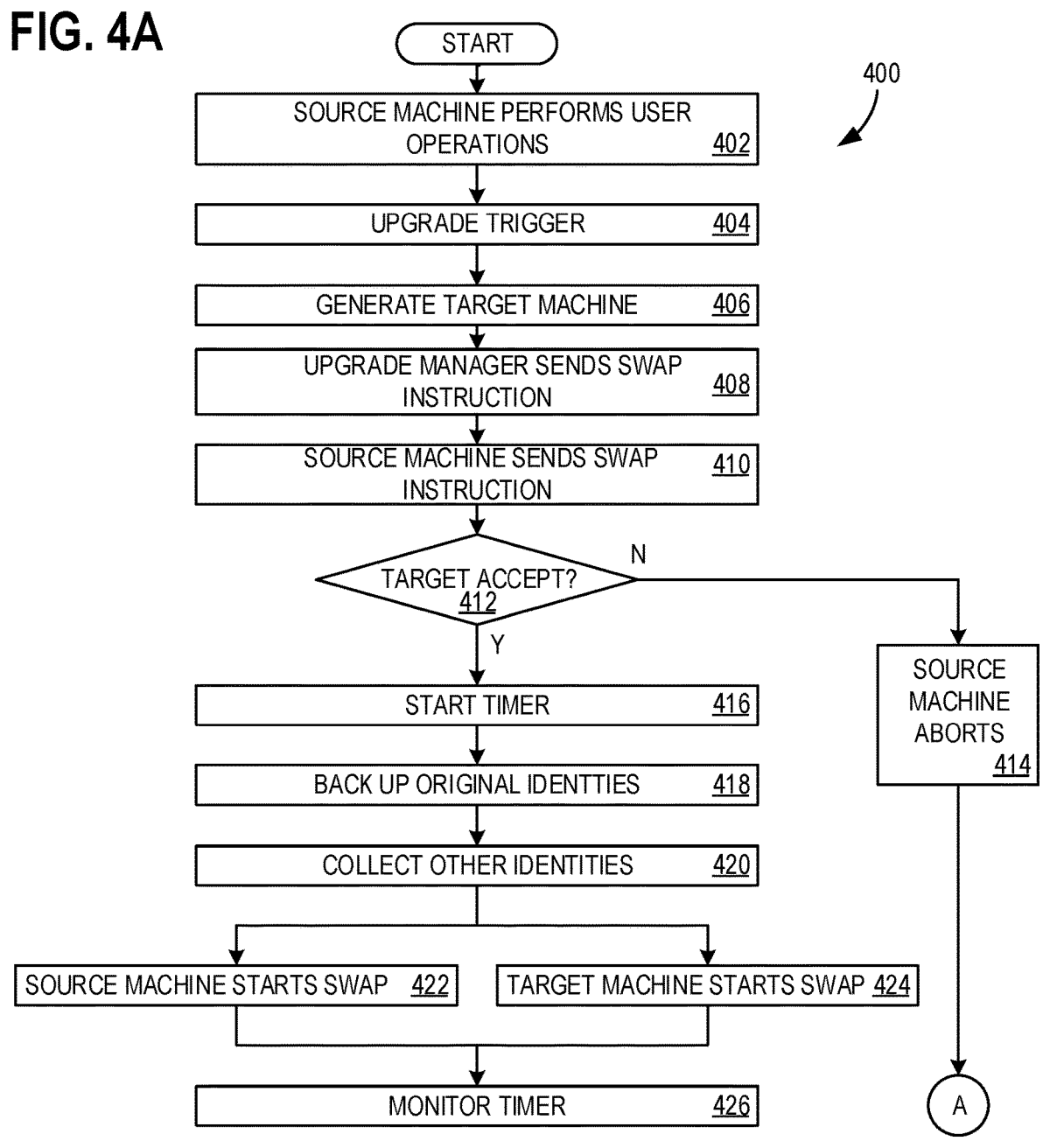

```
                    ( START )
                        │
                        ▼
        ┌─────────────────────────────────┐
        │ SOURCE MACHINE PERFORMS USER    │
        │ OPERATIONS                  402 │
        └─────────────────────────────────┘
                        │
                        ▼
        ┌─────────────────────────────────┐
        │ UPGRADE TRIGGER             404 │
        └─────────────────────────────────┘
                        │
                        ▼
        ┌─────────────────────────────────┐
        │ GENERATE TARGET MACHINE     406 │
        └─────────────────────────────────┘
                        │
                        ▼
        ┌─────────────────────────────────┐
        │ UPGRADE MANAGER SENDS SWAP      │
        │ INSTRUCTION                 408 │
        └─────────────────────────────────┘
                        │
                        ▼
        ┌─────────────────────────────────┐
        │ SOURCE MACHINE SENDS SWAP   410 │
        │ INSTRUCTION                     │
        └─────────────────────────────────┘
                        │
                        ▼
                  ◇ TARGET ACCEPT? ◇ ──── N ──────┐
                        412                        │
                        │                          ▼
                        │ Y              ┌──────────────────┐
                        ▼                │ SOURCE           │
        ┌─────────────────────────────┐ │ MACHINE          │
        │ START TIMER             416 │ │ ABORTS           │
        └─────────────────────────────┘ │              414 │
                        │                └──────────────────┘
                        ▼                          │
        ┌─────────────────────────────┐            │
        │ BACK UP ORIGINAL IDENTTIES  │            │
        │                         418 │            │
        └─────────────────────────────┘            │
                        │                          │
                        ▼                          │
        ┌─────────────────────────────┐            │
        │ COLLECT OTHER IDENTITIES 420│            │
        └─────────────────────────────┘            │
                 │            │                     │
                 ▼            ▼                     │
    ┌──────────────────┐  ┌──────────────────────┐ │
    │ SOURCE MACHINE   │  │ TARGET MACHINE       │ │
    │ STARTS SWAP  422 │  │ STARTS SWAP      424 │ │
    └──────────────────┘  └──────────────────────┘ │
                 │            │                     │
                 ▼            ▼                     ▼
        ┌─────────────────────────────┐          ( A )
        │ MONITOR TIMER           426 │
        └─────────────────────────────┘
```

Figure 4B:
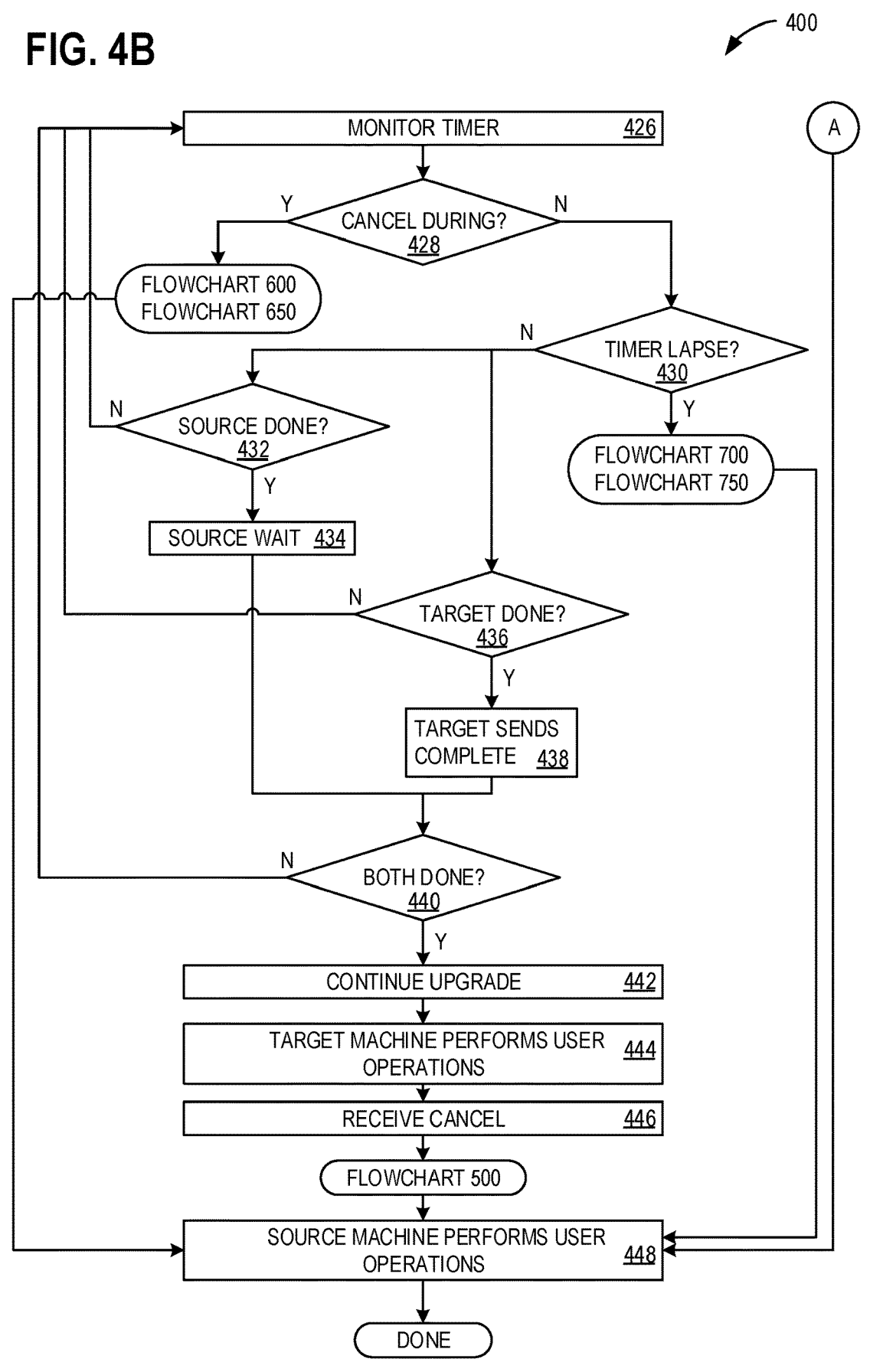

MONITOR TIMER                    426

CANCEL DURING?                   428

Y

N

FLOWCHART 600
FLOWCHART 650

TIMER LAPSE?                     430

N

Y

SOURCE DONE?                     432

N

Y

FLOWCHART 700
FLOWCHART 750

SOURCE WAIT    434

TARGET DONE?                     436

N

Y

TARGET SENDS
COMPLETE    438

BOTH DONE?                       440

N

Y

CONTINUE UPGRADE                 442

TARGET MACHINE PERFORMS USER
OPERATIONS                       444

RECEIVE CANCEL                   446

FLOWCHART 500

SOURCE MACHINE PERFORMS USER
OPERATIONS                       448

DONE

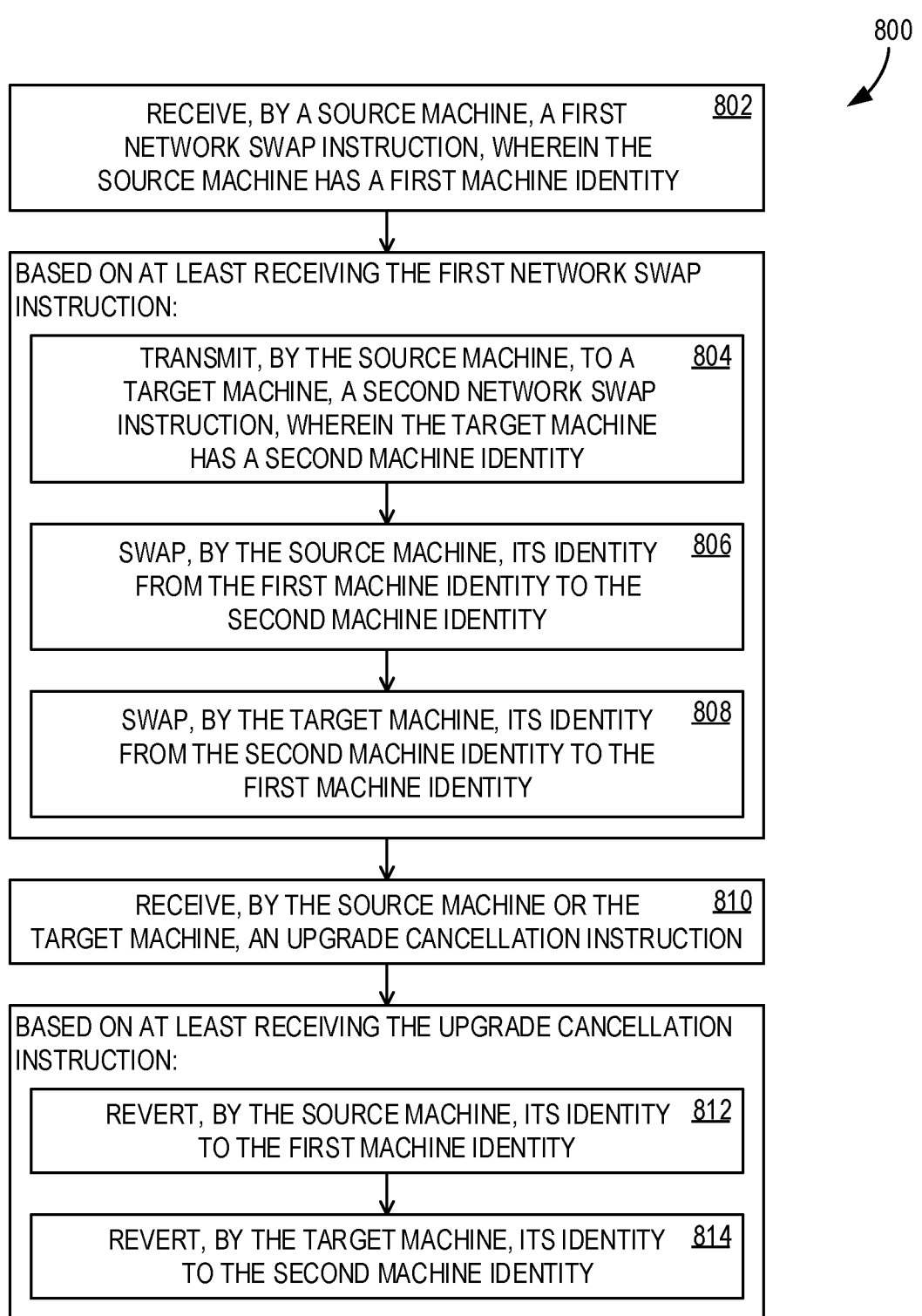

800

RECEIVE, BY A SOURCE MACHINE, A FIRST 802
NETWORK SWAP INSTRUCTION, WHEREIN THE
SOURCE MACHINE HAS A FIRST MACHINE IDENTITY

BASED ON AT LEAST RECEIVING THE FIRST NETWORK SWAP
INSTRUCTION:

TRANSMIT, BY THE SOURCE MACHINE, TO A 804
TARGET MACHINE, A SECOND NETWORK SWAP
INSTRUCTION, WHEREIN THE TARGET MACHINE
HAS A SECOND MACHINE IDENTITY

SWAP, BY THE SOURCE MACHINE, ITS IDENTITY 806
FROM THE FIRST MACHINE IDENTITY TO THE
SECOND MACHINE IDENTITY

SWAP, BY THE TARGET MACHINE, ITS IDENTITY 808
FROM THE SECOND MACHINE IDENTITY TO THE
FIRST MACHINE IDENTITY

RECEIVE, BY THE SOURCE MACHINE OR THE 810
TARGET MACHINE, AN UPGRADE CANCELLATION INSTRUCTION

BASED ON AT LEAST RECEIVING THE UPGRADE CANCELLATION
INSTRUCTION:

REVERT, BY THE SOURCE MACHINE, ITS IDENTITY 812
TO THE FIRST MACHINE IDENTITY

REVERT, BY THE TARGET MACHINE, ITS IDENTITY 814
TO THE SECOND MACHINE IDENTITY

CANCELLATION OF A MIGRATION-BASED UPGRADE USING A NETWORK SWAP WORKFLOW

BACKGROUND

One approach to upgrading a virtual machine (VM) is to migrate a user from the current VM to a new VM. A migration-based upgrade transfers the identity and data from the source VM to the new VM. Typically, that includes shutting down the source VM so that the target VM takes over its networking.

Unfortunately, it is sometimes necessary to cancel an upgrade, either because the target VM is not operating properly, or because the customer (user) requested a cancellation for some reason. Currently, canceling the upgrade requires shutting down the target VM to free up the networking identity and powering the source VM back on. These operations take time, introduce risk of further performance issues, and require orchestration by an attentive party.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide for a time and computing resource efficient non-disruptive cancellation of a migration-based upgrade using a network swap workflow. Solutions include: receiving, by a source machine, a first network swap instruction, wherein the source machine has a first machine identity; based on at least receiving the first network swap instruction: transmitting, by the source machine, to a target machine, a second network swap instruction, wherein the target machine has a second machine identity; swapping, by the source machine, its identity from the first machine identity to the second machine identity; and swapping, by the target machine, its identity from the second machine identity to the first machine identity; receiving, by the source machine or the target machine, an upgrade cancellation instruction; and based on at least receiving the upgrade cancellation instruction; reverting, by the source machine, its identity to the first machine identity; and reverting, by the target machine, its identity to the second machine identity.

BRIEF DESCRIPTION OF THE DRAWINGS

The present description will be better understood from the following detailed description read in the light of the accompanying drawings, wherein:

FIG. 1 illustrates an example architecture that advantageously provides for efficient cancellation of a migration-based upgrade using a network swap workflow:

FIG. 2 illustrates further detail for an example virtualization architecture that may be used with an example architecture such as that of FIG. 1:

FIGS. 4A and 4B together illustrate a flowchart of exemplary operations associated with an example architecture such as that of FIG. 1:

FIG. 8 illustrates a flowchart of exemplary operations associated with an example architecture such as that of FIG. 1; and FIG. 9 illustrates a block diagram of an example computing apparatus that may be used as a component of an example architecture such as that of FIG. 1.

Figure 3:
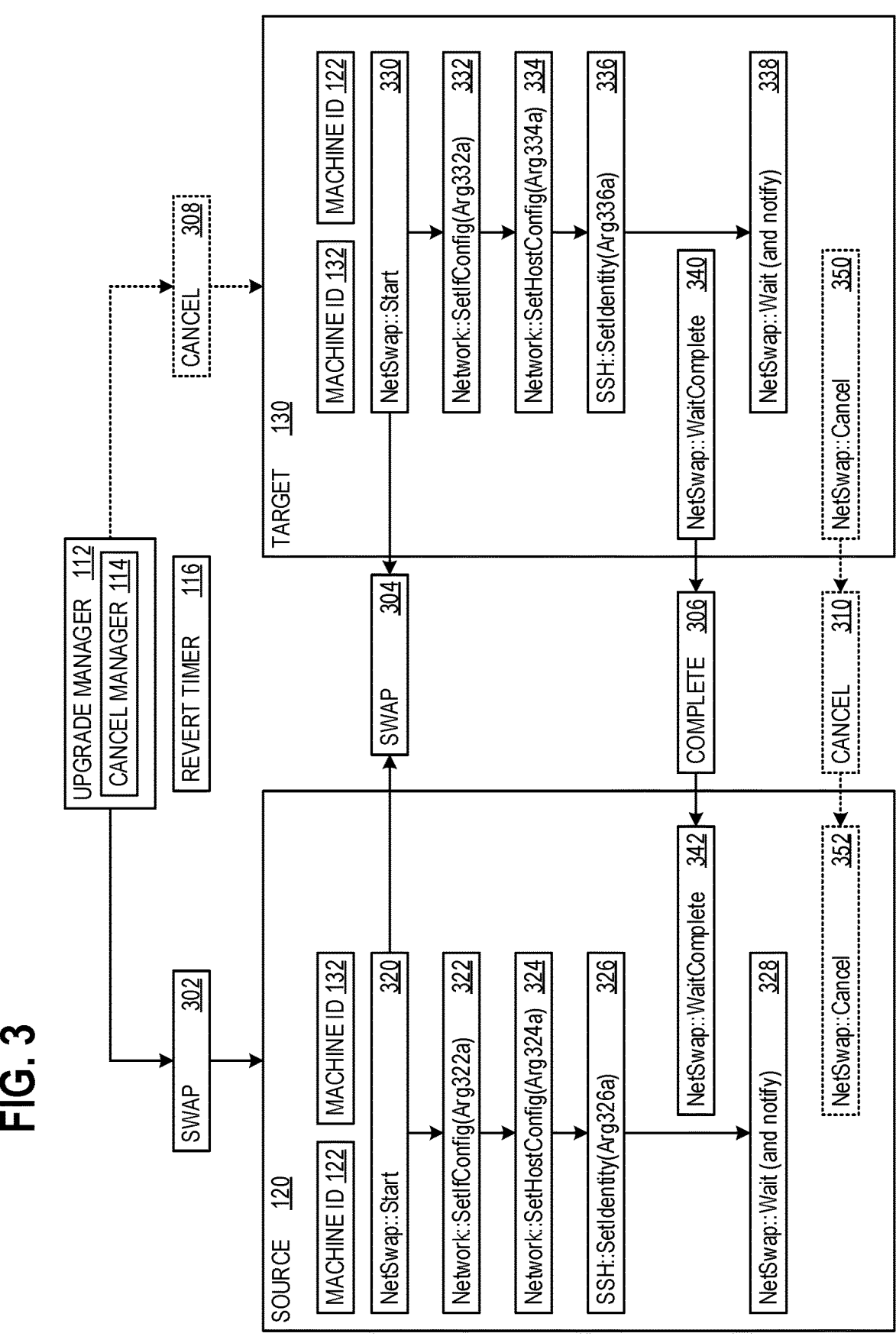
FIG. 3 illustrates a notional view of the network swap workflow used by an example architecture such as that of FIG. 1.

Any of the figures may be combined together into a single example or embodiment.

DETAILED DESCRIPTION

A time and computing resource-efficient, non-disruptive cancellation of a migration-based virtual machine (VM) upgrade uses a network swap workflow. The cancellation may be performed without requiring user involvement, such as providing login credentials. A source machine and a target machine swap machine identities such that, for example, the target machine takes on the internet protocol (IP) address of the source machine and the source machine takes on the original IP address of the target machine. Upon a cancellation of the upgrade, the source machine and the target machine revert to their original machine identities, for example, swapping machine identities again. This approach permits the target machine to assume the role of the source machine for the user if the upgrade is not canceled, and also permits the source machine to rapidly resume its role for the user if there is a cancellation. Advantageously, fewer computing resources are required.

Aspects of the disclosure improve technical efficiencies by reducing the computing resources needed to roll back or otherwise cancel a VM upgrade, when either requested by a user or necessitated by performance problems with the upgraded VM. This reduces the number of physical computing components needed to achieve a given level of computing resource performance, for example, by eliminating additional network adapter hardware used by some prior solutions. This is accomplished, at least in part, by swapping, by the source machine and the target machine, their identities and, based on at least receiving the upgrade cancellation instruction, reverting, by the source machine and the target machine, to their original identities.

FIG. 1 illustrates an example architecture 100 that advantageously provides for efficient cancellation of a migration-based upgrade using a network swap workflow. With architecture 100, a user 102 employs a user terminal 104 as a client to access VMs on a computing platform 110 which, in turn, access an application (app) 154 on an external resource 152. User terminal 104 may be implemented on one or more computing apparatus 918 of FIG. 9, and computing platform 110 may be implemented on one or more computing apparatus 918 of FIG. 9, and/or using a virtualization architecture 200 as is illustrated in FIG. 2.

User terminal 104, computing platform 110, and external resource 152 are separated by a network 150, such as the internet. In some examples, app 154 is an e-mail client or some other productivity or other software. In the illustrated example, external resource 152 comprises an office application suite of software apps. Thus, a user password 106 is required to access external resource 152. In the illustrated upgrade scenario, user 102 migrates among the VMs on computing platform 110, initially using a source machine 120 and then starting a move to a target machine 130 as part of an upgrade.

In some examples, source machine 120 and target machine 130 are both on the same subnet, shown as a network 108. A subnet (subnetwork) is a logical subdivision of an internet protocol (IP) network. Computing resources that belong to the same subnet are addressed with sufficiently similar IP addresses that, with a subnet mask (e.g., 255.255.255.0 for IP version 4, or IPv4), yield the same routing prefix. IP traffic is exchanged between subnets through routers and, in general, a router serves as a logical or physical boundary between subnets.

Source machine 120 initially has a machine identity 122 which, in the illustrated example, comprises network configuration information 124, network interface information 126, and network identity information 128. Similarly, target machine 130 initially has a machine identity 132 which comprises network configuration information 134, network interface information 136, and network identity information 138. Network configuration information 124 and network configuration information 134 each comprises an IP address. When source machine 120 and target machine 130 are both on the same network 108 (e.g., same subnet), the IP addresses of network configuration information 124 and network configuration information 134 have the same routing prefix.

An upgrade manager 112 manages the upgrade from source machine 120 to target machine 130, using a network revert timer 116 to determine whether the upgrade completes in a timely manner. A cancellation manager 114 handles the cancellation of the upgrade as is described in further detail in relation to FIGS. 3-8. The upgrade includes a swap of machine identity 122 and machine identity 132, such that source machine 120 moves to machine identity 132 while target machine 130 moves to machine identity 122. Upon cancellation of the upgrade, source machine 120 moves back to machine identity 122 while target machine 130 moves back to machine identity 132.

This scheme minimizes risk and interruption for user 103, for example, by not requiring user 102 to be involved, or for either upgrade manager 112 or cancellation manager 114 to know user password 106. This is because user 102 logs into external resource 152 using a VM with machine identity 122. Initially, this is source machine 120. During the upgrade, when target machine 130 takes over machine identity 122, this is transparent to external resource 152. Therefore, no additional log-in event using user password 106 is required. The same situation occurs for the cancellation: External resource 152 sees only that it is being used by a machine with machine identity 122.

Examples of architecture 100 are operable with virtualized and non-virtualized storage solutions. FIG. 2 illustrates virtualization architecture 200 that may be used as a version of computing platform 110. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines (VMs), containers, applications, or any compute entity that consumes storage. VMs include, for example, base objects, linked clones, and independent clones. A compute entity includes, for example, a computing instance or a virtualized computing instance. When objects are created, they may be designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 may be local objects. In some examples, a single compute node may host 50, 100, or a different number of objects. Each object uses a VM disk (VMDK), for example VMDKs 211-218 for each of objects 201-208, respectively. Other implementations using different formats are also possible. A virtualization platform 230, which includes hypervisor functionality at one or more of compute nodes 221, 222, and 223, manages objects 201-208. In some examples, various components of virtualization architecture 200, for example compute nodes 221, 222, and 223, and storage nodes 241, 242, and 243 are implemented using one or more computing apparatus such as computing apparatus 918 of FIG. 9.

Virtualization software that provides software-defined storage (SDS), by pooling storage nodes across a cluster, creates a distributed, shared data store, for example a storage area network (SAN). Objects 201-208 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 252, and 254; storage node 242 has storage 255 and 256; and storage node 243 has storage 257 and 258. In some examples, a single storage node may include a different number of physical storage components.

In the described examples, storage nodes 241-243 are treated as a SAN with a single global object, enabling any of objects 201-208 to write to, and read from, any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

FIG. 3 illustrates a notional view of the network swap workflow used by examples of architecture 100. While the example of FIG. 3 is described with reference to example commands or instructions, the disclosure is not limited to these example commands and instructions. Other examples contemplate different, additional, or fewer commands or instructions. The upgrade begins when upgrade manager 112 sends a first network swap instruction 302 to source machine 120. Source machine 120 executes a "NetSwap: Start" command 320 (e.g., network swap start) and sends a second network swap instruction 304 to target machine 130. Upon receiving network swap instruction 304, target machine 130 executes a "NetSwap: Start" command 330. Source machine 120 and target machine 130 each backs up their own original machine identity and learns and stores the other's machine identity.

Source machine 120 executes a "Network:: SetIfConfig( )" command 322, with the argument, Arg322*a*, to set network configuration information 134 (e.g., the network configuration information for machine identity 132). IfConfig stands for "interface configuration" and a SetIfConfig( ) command is used to change the configuration of network interfaces, for example to assign an IP address. Executing command 322 with Arg322*a* set to network configuration information 134 changes the IP address of source machine 120 to the IP address that had originally been assigned to target machine 130.

Similarly, target machine 130 executes a "Network:: SetIfConfig( )" command 332, with the argument, Arg332*a*, set to network configuration information 124 (e.g., the network configuration information for machine identity 122). This changes the IP address of target machine 130 to the IP address that had earlier been assigned to source machine 120.

Source machine 120 executes a "Network::SetHostConfig ( )" command 324, with the argument, Arg324*a*, set to network interface information 136 (the network interface information for machine identity 132). Target machine 130 executes a "Network::SetHostConfig( )" command 334, with the argument, Arg334*a*, set to network interface information 126 (e.g., the network interface information for machine identity 122). A SetHostConfig( ) command is used to set a machine's host parameters.

Source machine 120 executes a "SSH::SetIdentity( )" command 326, with the argument, Arg326*a*, set to network identity information 138 (e.g., the network identity information for machine identity 132). Target machine 130 executes a "SSH::SetIdentity( )" command 336, with the argument, Arg336*a*, set to network identity information 128 (the network identity information for machine identity 122).

An ssh command establishes an ssh connection with another machine; for example, to connect to a remote host for a terminal session. An ssh passwordless login is an ssh authentication method that employs a pair of public and private keys for asymmetric encryption. The public key resides on the server, and only a client that presents the private key is permitted to connect. Some examples of architecture 100 use ssh passwordless login, as illustrated. Some examples may use certificate negotiations or a secure application programming interface (API).

A SetIdentity ( ) command uses an identity key, which is a private key that is used in secure shell (SSH, a.k.a. secure shell or secure socket shell) for granting access to servers that use public key authentication. Once the host key has been stored, the client system can connect directly to that server again without need for any further approvals. Instead, the host key authenticates the connection. After executing command 336 with Arg336*a* set to network identity information 128, target machine 130 is able to connect to external resource 152 without needing user password 106.

Upon completion of command 326, source machine 120 moves to a "NetSwap::Wait" state 328. In some examples, source machine 120 sends gratuitous address resolution protocol (ARP) messages upon entering state 328. A gratuitous ARP broadcast is a request for a router's own IP address. If a router or switch sends an ARP request for its own IP address and no ARP replies are received, the router- or switch-assigned IP address is not being used by other nodes. In some examples, source machine 120 uses IP version 6 (IPv6) unsolicited neighbor advertisement (NA). Neighbor discovery (including NA) is a protocol used for IPV6 traffic that allows different nodes on the same link to advertise their existence to their neighbors, and to learn about the existence of their neighbors.

Similarly, in some examples, upon completion of command 336, target machine 130 moves to a "NetSwap::Wait" state 338. In some examples, target machine 130 instead moves into a "NetSwap::WaitComplete" state 340 and sends a completion notification 306 to source machine 120. Upon receiving completion notification 306, source machine moves into a "NetSwap::WaitComplete" state 342.

Source machine 120 now has machine identity 132 and target machine 130 now has machine identity 122. Target machine 130 is now able to perform operations for user 102 with external resource 152 (e.g., user 102 uses target machine 130 to access external resource 152).

Upon the need for a cancellation, cancellation manager 114 sends an upgrade cancellation instruction 308 to target machine 130. Target machine 130 executes a "NetSwap: Cancel" command 350 and sends a cancellation notification 310 to source machine 120. Upon receiving cancellation notification 310, source machine 120 executes a "NetSwap: Cancel" command 352. Source machine 120 and target machine 130 each reverts back to own original machine identity. Specifically, source machine 120 returns to machine identity 122 and target machine 130 returns to machine identity 122.

To accomplish this, source machine 120 again executes "Network::SetIfConfig( )" command 322, "Network:: SetHostConfig( )" command 324, and "SSH::SetIdentity( )" command 326, but with Arg322*a*, Arg324*a*, and Arg326*a*, from machine identity 122. Target machine 130 again executes "Network::SetIfConfig( )" command 332, "Network::SetHostConfig( )" command 334, and "SSH::SetIdentity( )" command 336, but with Arg332*a*, Arg334*a*, and Arg336*a*, from machine identity 132.

FIGS. 4A and 4B together illustrate a flowchart 400 of exemplary operations that perform the process described thus far. In some examples, the operations of flowchart 400 are performed by one or more computing apparatus 918 of FIG. 9. Starting with FIG. 4A, flowchart 400 commences with source machine 120 performing user operations with external resource 152 in operation 402, prior to receiving network swap instruction 302. In operation 404, upgrade manager 112 senses a trigger condition to start an upgrade and triggers the process of generating target machine 130 in operation 406.

In some examples, source machine 120 and target machine each comprises a VM. At this point, source machine 120 has machine identity 122 and target machine 130 has machine identity 132. Machine identities 122 and 132 each comprise network configuration information, network interface information, and the network identity information. The network configuration information of machine identity 122 comprises a first IP address and the network configuration information of machine identity 132 comprises a second IP address.

In operation 408, upgrade manager 112 transmits network swap instruction 302 to source machine 120, and source machine 120 receives network swap instruction 302. Further operations in flowchart 400 are based on at least source machine 120 receiving network swap instruction 302.

Source machine 120 transmits network swap instruction 304 to target machine 130 in operation 410. In decision operation 412, source machine 120, determines whether target machine 130 accepts the swap. If not, source machine 120 aborts the network swap in operation 414 and retains machine identity 122 (e.g., retains its original network configuration, network interface, and network identity). Flowchart 400 then moves to operation 448 in FIG. 4B.

However, if target machine 130 accepts, flowchart 400 moves to operation 416, which starts network revert timer 116. In operation 418, each machine backs up its own network configuration, network interface (e.g., SSH), and identity information for use on cancellation/revert. Source machine 120 backs up machine identity 122 and target machine 130 backs up machine identity 132. Each machine collects and stores the other's network configuration, network interface, and identity information for use in the network apply workflow (e.g., the network swap) in operation 420. Source machine 120 collects and stores machine identity 132 and target machine 130 collects and stores machine identity 122.

Each machine then performs the network swap workflow, which includes operations 422-442. In operation 422, source machine 120 starts its network swap process, in which source machine 120 swaps its identity from machine identity 122 to machine identity 132. In operation 424, target machine 130 starts its network swap process, in which target machine 130 swaps its identity from machine identity 132 to machine identity 122. In some examples, the swapping does not require use of user password 106.

In operation 426, upgrade manager 112 and/or cancellation manager 114 monitor network revert timer 116. Moving to FIG. 4B, decision operation 428 determines whether there has been a cancellation during the switchover (e.g., before flowchart 400 has reached operation 442. At this stage, either source machine 120 or target machine 130 may receive an upgrade cancellation instruction. If source machine 120 or target machine 130 receives upgrade cancellation instruction 308 in decision operation 428, flowchart 400 exits to flowchart 600 (FIG. 6A) or flowchart 650 (FIG. 6B) before returning to operation 448. Flowchart 600 is used if source machine 120 receives upgrade cancellation instruction 308, although flowchart 650 is used if target machine 130 receives upgrade cancellation instruction 308.

Otherwise, decision operation 430 determines whether network revert timer 116 has lapsed. If so, flowchart 400 exits to flowchart 700 (FIG. 7A) or flowchart 750 (FIG. 7B) before returning to operation 448. Flowchart 700 is used if network revert timer 116 lapsed because of an error with source machine 120, although flowchart 750 is used if network revert timer 116 lapsed because of an error with target machine 130.

If network revert timer 116 has not yet lapsed, flowchart 400 moves to decision operations 432 and 436 in parallel. Decision operation 432 determines whether source machine 120 has completed swapping to machine identity 132. If not, this branch of flowchart moves back to monitoring network revert timer 116 in operation 426. However, if source machine 120 has completed swapping to machine identity 132, source machine 120 enters a wait state (state 328) in operation 434.

Similarly, decision operation 436 determines whether target machine 130 has completed swapping to machine identity 122. If not, this branch of flowchart moves back to monitoring network revert timer 116 in operation 426. However, if target machine 130 has completed swapping to machine identity 122 then, in operation 438, based on at least target machine 130 completing the swapping from machine identity 132 to machine identity 122, target machine 130 transmits completion notification 306 to source machine 120. Because target machine 130 expects source machine 120 to have completed swapping to machine identity 132, target machine 130 transmits completion notification 306 using network configuration information of machine identity 132 (e.g., the IP address that target machine 130 itself had, prior to its own swap).

It is possible that target machine 130 completes its swap before source machine 120 completes, so decision operation 440 determines whether both machines are done with the swap. If not, flowchart moves back to monitoring network revert timer 116 in operation 426 and target machine 130 transmits completion notification 306 to source machine 120 repeatedly until either source machine 120 confirms its own completion, or else network revert timer 116 lapses, as determined in decision operation 430.

When both machines are complete, flowchart 400 moves to operation 442 to continue with the upgrade. In operation 444, after completing the swapping by both source machine 120 and target machine 130 and prior to source machine 120 reverting to machine identity 122, target machine 130 performs user operations with external resource 152.

Target machine 130 receives upgrade cancellation instruction 308 in operation 446. Flowchart 400 exits to flowchart 500 (FIG. 5) to perform the cancellation, before returning to operation 448. After reverting to machine identity 122, source machine 120 performs user operations with external resource 152.

Figure 5:
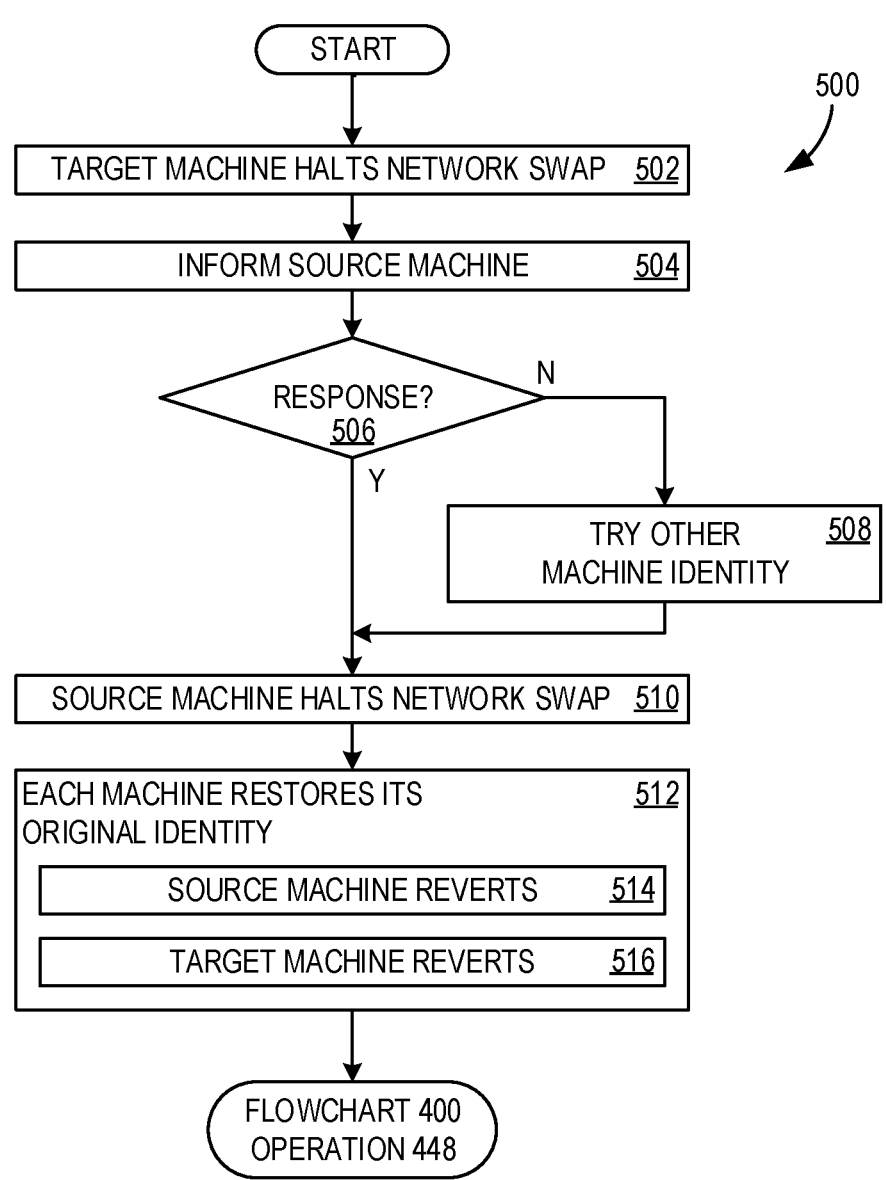
FIG. 5 illustrates a flowchart of exemplary operations associated with a migration-based upgrade cancellation, which may be used with example operations such as those of FIG. 4.

FIG. 5 illustrates a flowchart 500 of exemplary operations associated with cancelling the upgrade. In some examples, the operations of flowchart 500 are performed by one or more computing apparatus 918 of FIG. 9. Flowchart 500 commences with target machine 130 halting its network swap workflow in operation 502.

In operation 504, based on at least target machine 130 receiving upgrade cancellation instruction 308, target machine 130 transmits cancellation notification 310 to source machine 120 using network configuration information 134 of machine identity 132. Target machine 130 uses its own original identity first, allowing for source machine 120 to have already swapped its IP address.

In decision operation 506, target machine 130 determines whether source machine 120 has responded. If not, target machine 130 transmits cancellation notification 310 to source machine 120 using network configuration information of machine identity 122. This is to allow for the possibility that source machine 120 has not already swapped its IP address. In either case, flowchart 510 moves to operation 508 where source machine 120 halts its network swap workflow.

In operation 512, each machine reverts to its original identity. In some examples, commands shown in FIG. 3 are executed again. Source machine 120 reverts to machine identity 122 in operation 514 and target machine 130 reverts to machine identity 132 in operation 516. Flowchart 500 then exits to operation 448 of flowchart 400.

Figure 6A:
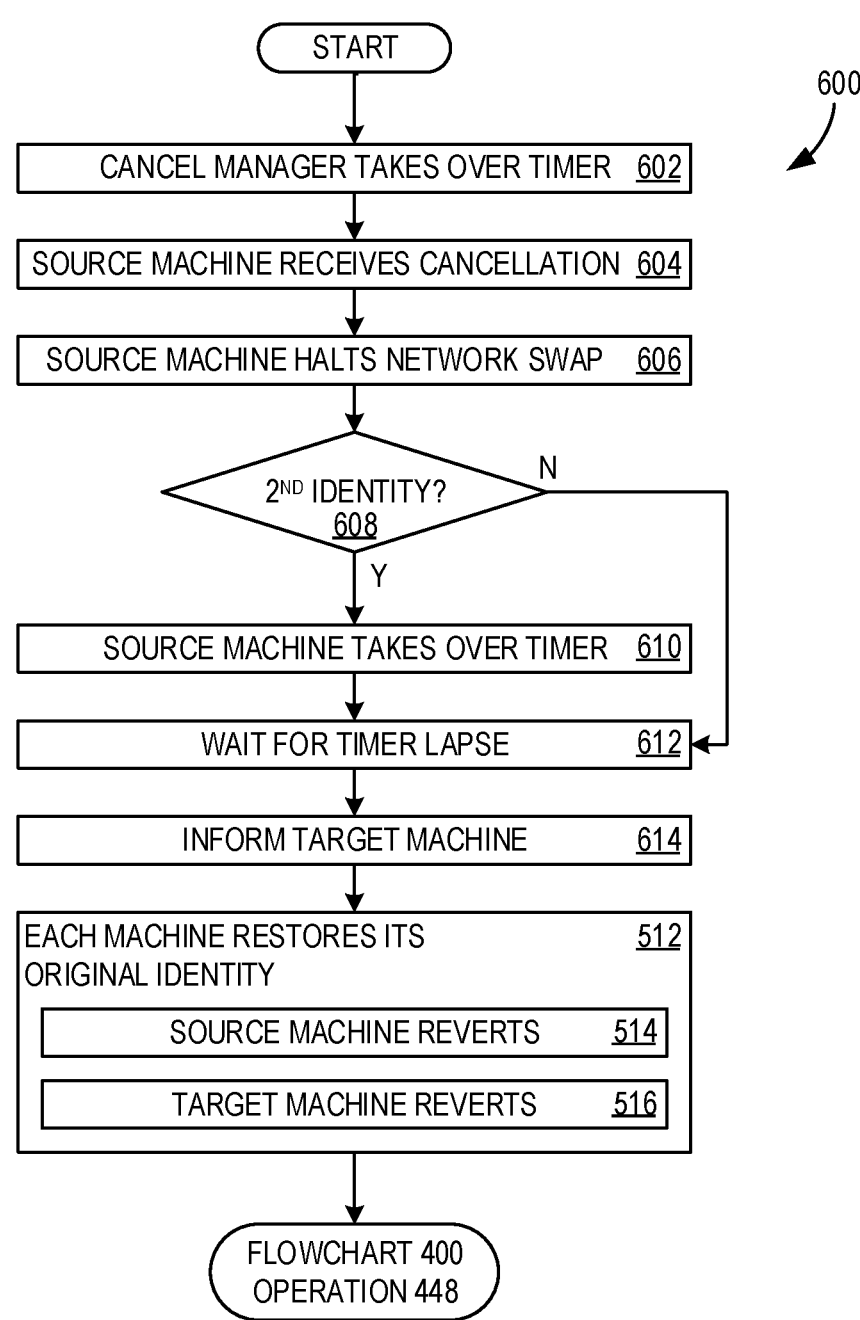
FIGS. 6A and 6B illustrates additional flowcharts of exemplary operations associated with a migration-based upgrade cancellation, which may be used with example operations such as those of FIG. 4.

FIG. 6A illustrates a flowchart 600 of exemplary operations associated with source machine 120 receiving cancellation instruction 308. In some examples, the operations of flowchart 600 are performed by one or more computing apparatus 918 of FIG. 9. Flowchart 600 commences with cancellation manager 114 taking over network revert timer 116 in operation 602. Source machine 120 receives cancellation instruction 308 in operation 604.

In operation 606, source machine 120 halts the network apply workflow for itself. Decision operation 608 allows for the cancellation to have occurred before source machine 120 has taken on machine identity 132. If so, source machine 120 takes over network revert timer 116 in operation 610, and then waits for the lapse of waits for lapse of network revert timer 116 in operation 612. Otherwise, flowchart 600 moves directly to operation 612. In operation 614, source machine 120 sends cancellation notification 310 to target machine 130. As in flowchart 500, each machine reverts to its original identity (see operation 512) and flowchart 600 exits to flowchart 400.

Figure 6B:
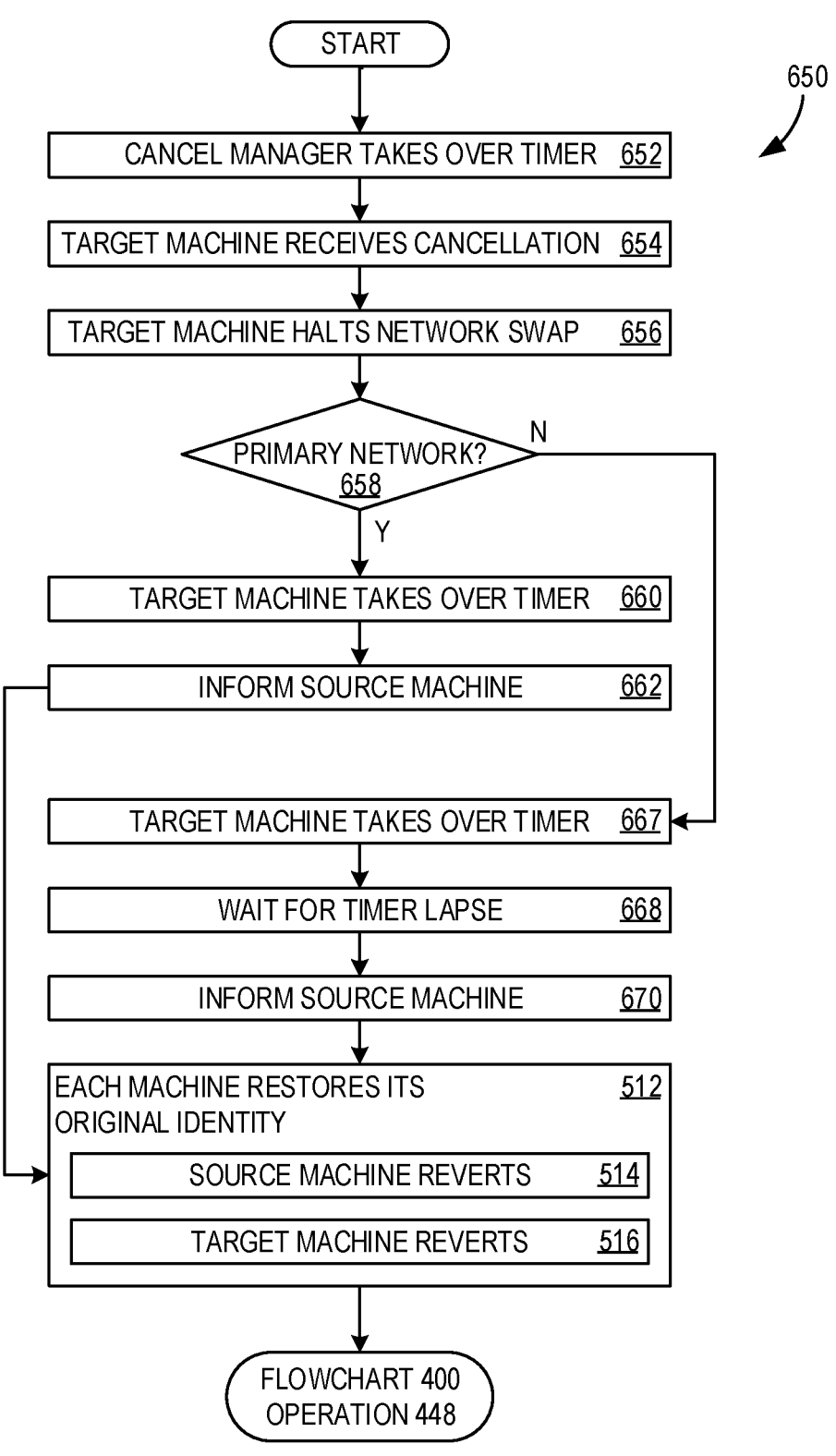

FIG. 6B illustrates a flowchart 650 of exemplary operations associated with target machine 130 receiving cancellation instruction 308. In some examples, the operations of flowchart 650 are performed by one or more computing apparatus 918 of FIG. 9. Flowchart 650 commences with cancellation manager 114 taking over network revert timer 116 in operation 652. Target machine 130 receives cancellation instruction 308 in operation 654.

In operation 656, target machine 130 halts the network apply workflow for itself. Decision operation 658 allows for the cancellation to have occurred before target machine 130 has taken on machine identity 122. If so, target machine 130 takes over network revert timer 116 in operation 660, and sends cancellation notification 310 to source machine 120 in operation 662. In some examples, target machine 130 tries using the network configuration information of machine identity 122 first, at this point, since the swap may not be far along enough for source machine 120 to have already changed its IP address.

Otherwise, target machine 130 takes over network revert timer 116 in operation 667, waits for network revert timer 116 to lapse in operation 668, and sends cancellation notification 310 to source machine 120 in operation 670. In some examples, target machine 130 tries using the network configuration information of machine identity 132 first, at this point, since the swap may be far along enough for source machine 120 to have already changed its IP address. In either case, after source machine 120 receives cancellation notification 310, as in flowchart 500, each machine reverts to its original identity (see operation 512) and flowchart 650 exits to flowchart 400.

Figure 7A:
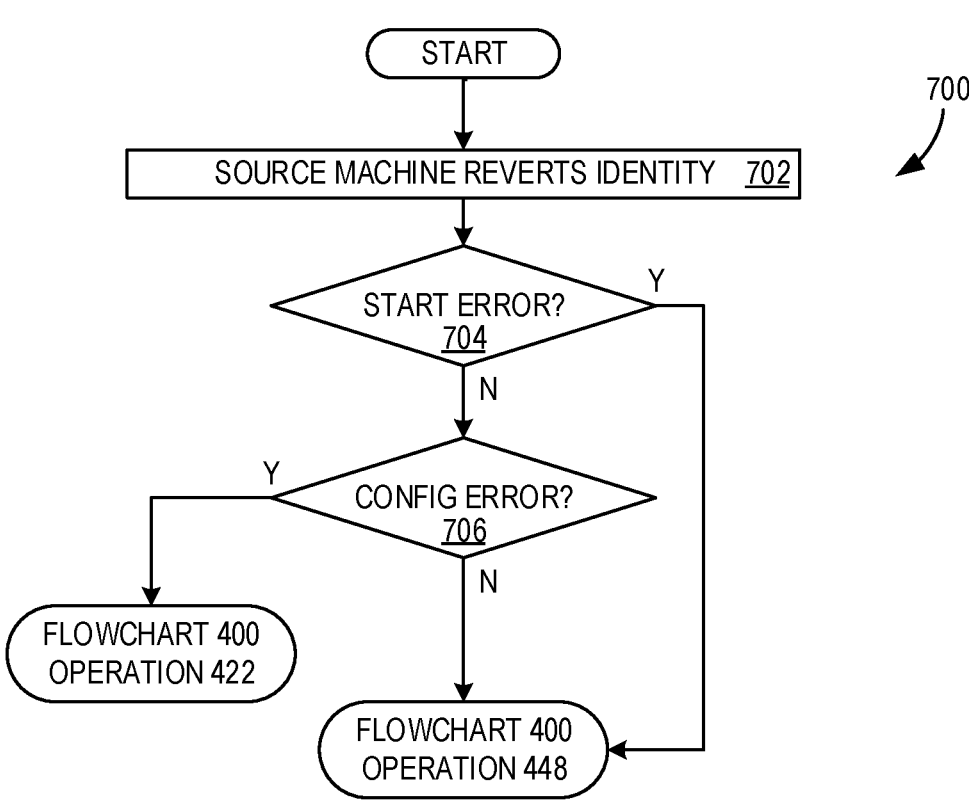
FIGS. 7A and 7B illustrate flowcharts of exemplary operations associated with a migration-based upgrade failure, which may be used with example operations such as those of FIG. 4.

FIG. 7A illustrates a flowchart 700 of exemplary operations associated with a failure of the switchover at source machine 120. In some examples, the operations of flowchart 700 are performed by one or more computing apparatus 918 of FIG. 9. Flowchart 700 commences with source machine 120 rolling back all steps already completed in the machine identity swap, in operation 702. Decision operation 704 determines whether there is an error in starting the swap. If so, flowchart 700 exits to operation 448 of flowchart 400. Otherwise, decision operation 706 determines whether there was an error in applying the target networking configuration. If so, flowchart 700 exits to operation 422 of flowchart 400 to attempt a restart. Otherwise, the swap is aborted and flowchart 700 exits to operation 448 of flowchart 400.

Figure 7B:
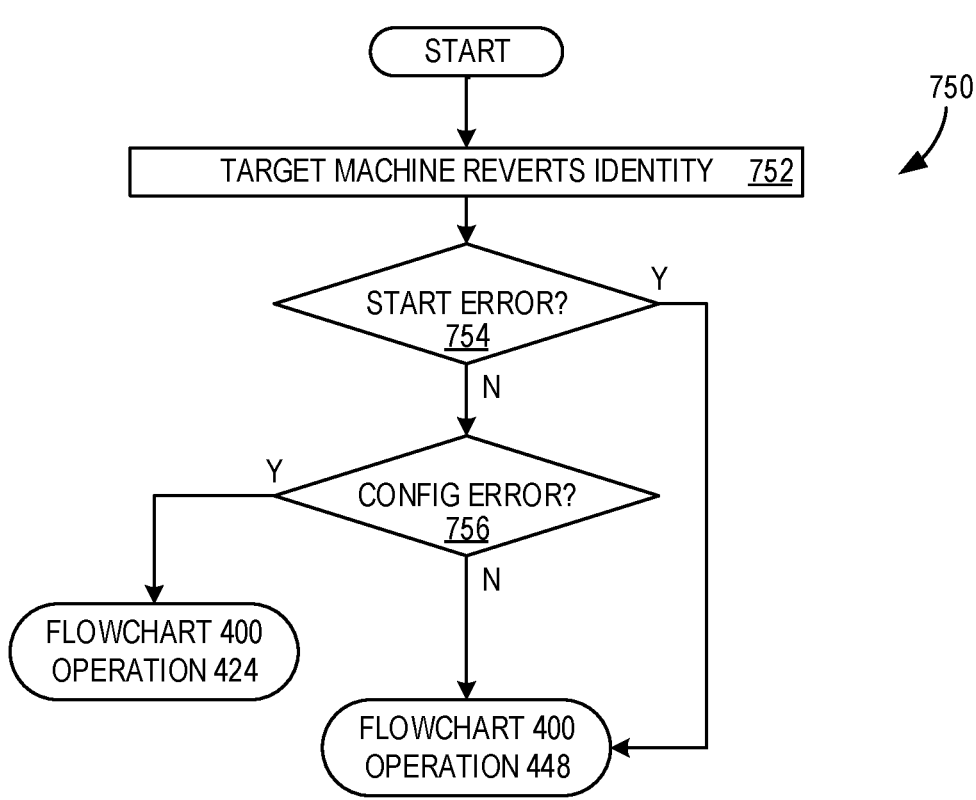

FIG. 7B illustrates a flowchart 750 of exemplary operations associated with a failure of the switchover at target machine 130. In some examples, the operations of flowchart 750 are performed by one or more computing apparatus 918 of FIG. 9. Flowchart 750 commences with target machine 130 rolling back all steps already completed in the machine identity swap, in operation 752. Decision operation 754 determines whether there is an error in starting the swap. If so, flowchart 750 exits to operation 448 of flowchart 400. Otherwise, decision operation 756 determines whether there was an error in applying the source networking configuration. If so, flowchart 750 exits to operation 424 of flowchart 400 to attempt a restart. Otherwise, the swap is aborted and flowchart 750 exits to operation 448 of flowchart 400.

FIG. 8 illustrates a flowchart 800 of exemplary operations associated with examples of architecture 100. In some examples, the operations of flowchart 800 are performed by one or more computing apparatus 918 of FIG. 9. Flowchart 800 commences with operation 802, which includes receiving, by a source machine, a first network swap instruction, wherein the source machine has a first machine identity.

Operations 804-808 are performed based on at least receiving the first network swap instruction. Operation 804 includes transmitting, by the source machine, to a target machine, a second network swap instruction, wherein the target machine has a second machine identity. Operation 806 includes swapping, by the source machine, its identity from the first machine identity to the second machine identity. Operation 808 includes swapping, by the target machine, its identity from the second machine identity to the first machine identity.

Operation 810 includes receiving, by the source machine or the target machine, an upgrade cancellation instruction. Operations 812 and 814 are performed based on at least receiving the upgrade cancellation instruction. Operation 812 includes reverting, by the source machine, its identity to the first machine identity. Operation 814 includes reverting, by the target machine, its identity to the second machine identity.

Additional Examples

An example method of cancelling a migration-based upgrade using a network swap workflow comprises: receiving, by a source machine, a first network swap instruction, wherein the source machine has a first machine identity; based on at least receiving the first network swap instruction; transmitting, by the source machine, to a target machine, a second network swap instruction, wherein the target machine has a second machine identity; swapping, by the source machine, its identity from the first machine identity to the second machine identity; and swapping, by the target machine, its identity from the second machine identity to the first machine identity; receiving, by the source machine or the target machine, an upgrade cancellation instruction; and based on at least receiving the upgrade cancellation instruction: reverting, by the source machine, its identity to the first machine identity; and reverting, by the target machine, its identity to the second machine identity.

An example computer system comprises: a processor; and a non-transitory computer readable medium having stored thereon program code executable by the processor, the program code causing the processor to: receive, by a source machine, a first network swap instruction, wherein the source machine has a first machine identity; based on at least receiving the first network swap instruction: transmit, by the source machine, to a target machine, a second network swap instruction, wherein the target machine has a second machine identity; swap, by the source machine, its identity from the first machine identity to the second machine identity; and swap, by the target machine, its identity from the second machine identity to the first machine identity; receive, by the source machine or the target machine, an upgrade cancellation instruction: and based on at least receiving the upgrade cancellation instruction: revert, by the source machine, its identity to the first machine identity; and revert, by the target machine, its identity to the second machine identity.

An example non-transitory computer storage medium has stored thereon program code executable by a processor, the program code embodying a method comprising: receiving, by a source machine, a first network swap instruction, wherein the source machine has a first machine identity;

based on at least receiving the first network swap instruction: transmitting, by the source machine, to a target machine, a second network swap instruction, wherein the target machine has a second machine identity; swapping, by the source machine, its identity from the first machine identity to the second machine identity; and swapping, by the target machine, its identity from the second machine identity to the first machine identity; receiving, by the source machine or the target machine, an upgrade cancellation instruction; and based on at least receiving the upgrade cancellation instruction: reverting, by the source machine, its identity to the first machine identity; and reverting, by the target machine, its identity to the second machine identity.

Alternatively, or in addition to the other examples described herein, examples include any combination of the following:

the first machine identity and the second machine identity each comprises network configuration information, network interface information, and network identity information;

neither the swapping nor the reverting requires use of a user password;

the swapping comprises executing a SetIfConfig( ) operation, a SetHostConfig( ) operation, and a Set Identity( ) operation;

based on at least the target machine completing the swapping from the second machine identity to the first machine identity, transmitting, by the target machine, to the source machine, a completion notification using network configuration information of the second machine identity;

based on at least the target machine receiving the upgrade cancellation instruction, transmitting, by the target machine, to the source machine, a cancellation notification using network configuration information of the second machine identity;

prior to receiving the first network swap instruction, performing, by the source machine, user operations with an external resource;

after reverting to the first machine identity by the source machine, performing, by the source machine, user operations with the external resource;

after completing the swapping by both the source machine and the target machine and prior to the source machine reverting to the first machine identity, performing, by the target machine, user operations with the external resource;

the source machine comprises a VM;

the target machine comprises a VM;

generating the target machine;

backing up, by the source machine, the first machine identity;

backing up, by the target machine, the second machine identity;

collecting, by the source machine, the second machine identity;

collecting, by the target machine, the first machine identity;

the SetIfConfig( ) operation sets an IP address;

network configuration information of the first machine identity comprises a first IP address;

network configuration information of the second machine identity comprises a second IP address; and starting a network revert timer.

Exemplary Operating Environment

Figure 9:
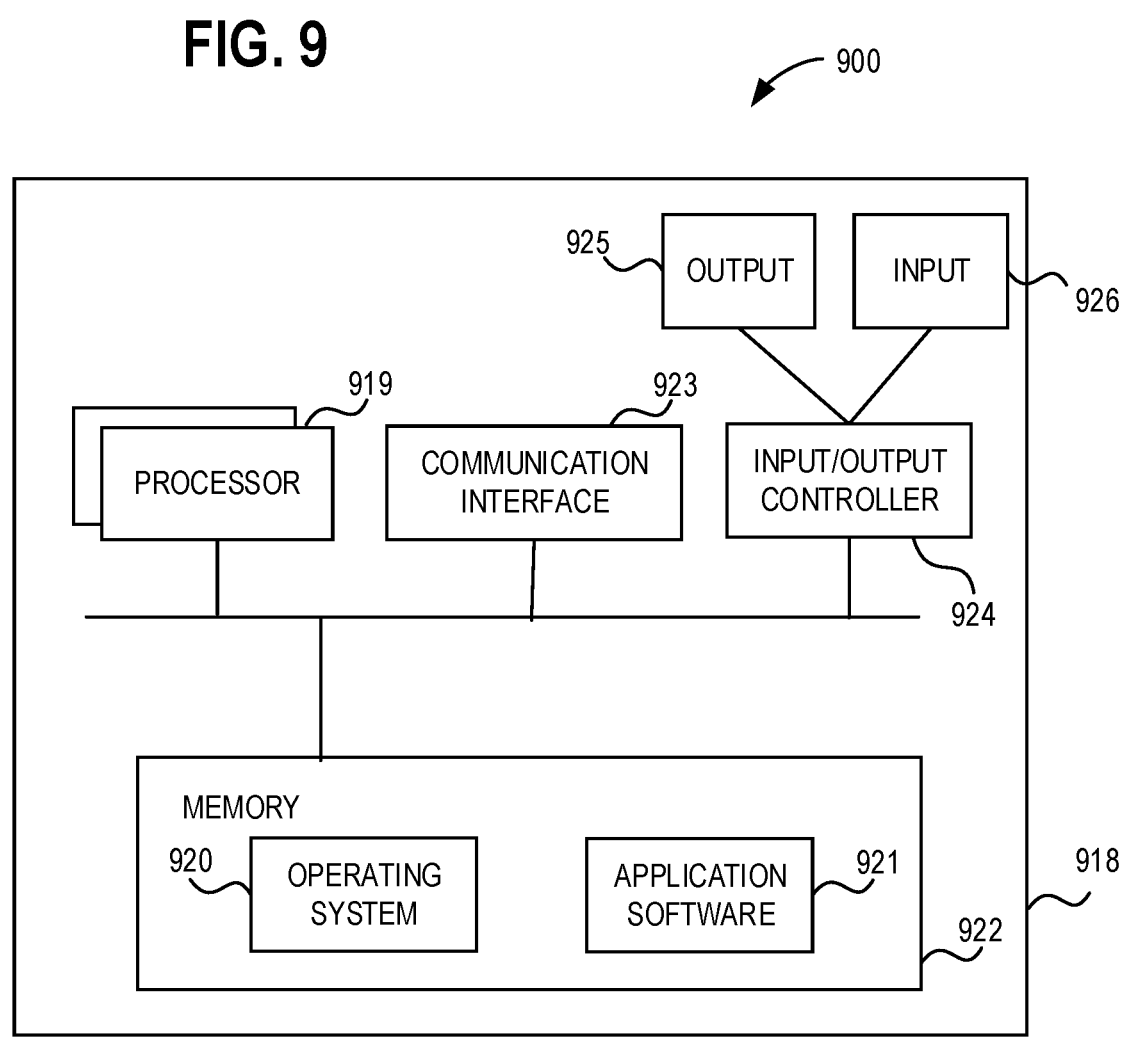

The present disclosure is operable with a computing device or other computing apparatus according to an embodiment shown as a functional block diagram 900 in FIG. 9. In an embodiment, components of a computing apparatus 918 may be implemented as part of an electronic device according to one or more embodiments described in this specification. The computing apparatus 918 comprises one or more processors 919 which may be microprocessors, controllers, or any other suitable type of processors for processing computer executable instructions to control the operation of the electronic device. Alternatively, or in addition, the processor 919 is any technology capable of executing logic or instructions, such as a hardcoded machine. Platform software comprising an operating system 920 or any other suitable platform software may be provided on the computing apparatus 918 to enable application software 921 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 918. Computer-readable media may include, for example, computer storage media such as a memory 922 and communications media. Computer storage media, such as a memory 922, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that the storage may be distributed or located remotely and accessed via a network or other communication link (e.g. using a communication interface 923). Computer storage media are tangible, non-transitory, and are mutually exclusive to communication media.

The computing apparatus 918 may comprise an input/output controller 924 configured to output information to one or more output devices 925, for example a display or a speaker, which may be separate from or integral to the electronic device. The input/output controller 924 may also be configured to receive and process an input from one or more input devices 926, for example, a keyboard, a microphone, or a touchpad. In one embodiment, the output device 925 may also act as the input device. An example of such a device may be a touch sensitive display. The input/output controller 924 may also output data to devices other than the output device, e.g. a locally connected printing device. In some embodiments, a user may provide input to the input device(s) 926 and/or receive output from the output device(s) 925.

The functionality described herein can be performed, at least in part, by one or more hardware logic components. According to an embodiment, the computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method comprising:
obtaining, by a source machine, a first network swap instruction, wherein the source machine has a first machine identity;
based at least on obtaining the first network swap instruction:
transmitting, by the source machine, to a target machine, a second network swap instruction, wherein the target machine has a second machine identity;
executing, by the source machine, a first function that swaps its identity from the first machine identity to the second machine identity by storing on the source machine an indicator of the second machine identity; and
executing, by the target machine, a second function that swaps its identity from the second machine identity to the first machine identity by storing on the target machine an indicator of the first machine identity;

obtaining, by the source machine or the target machine, an upgrade cancellation instruction; and based on at least obtaining the upgrade cancellation instruction:

executing, by the source machine, the first function to revert its identity to the first machine identity by storing on the source machine the indicator of the first machine identity; and executing by the target machine, the second function to revert its identity to the second machine identity by storing on the target machine the indicator of the second identity.

2. The computer-implemented method of claim 1, wherein the first machine identity and the second machine identity each comprise network configuration information, network interface information, and network identity information.

3. The computer-implemented method of claim 1, wherein neither the swapping nor the reverting requires use of a user password.

4. The computer-implemented method of claim 1, wherein the swapping comprises executing a network interface configuration operation, a host configuration operation, and a network identity setting operation.

5. The computer-implemented method of claim 1, further comprising:

based on at least the target machine completing the swapping from the second machine identity to the first machine identity, transmitting, by the target machine, to the source machine, a completion notification using network configuration information of the second machine identity.

6. The computer-implemented method of claim 1, further comprising:

based on at least the target machine obtaining the upgrade cancellation instruction, transmitting, by the target machine to the source machine, a cancellation notification using network configuration information of the second machine identity.

7. The computer-implemented method of claim 1, further comprising:

prior to obtaining the first network swap instruction, performing, by the source machine, user operations with an external resource; and after reverting to the first machine identity by the source machine, performing, by the source machine, user operations with the external resource.

8. The computer-implemented method of claim 7, further comprising:

after completing the swapping by both the source machine and the target machine and prior to the source machine reverting to the first machine identity, performing, by the target machine, user operations with the external resource.

9. A computer system comprising:

a processor; and a non-transitory computer readable medium having stored thereon program code executable by the processor, the program code causing the processor to:

based on at least a first network swap instruction:

transmit, by a source machine, to a target machine, a second network swap instruction, wherein the source machine has a first machine identity and the target machine has a second machine identity;

execute, by the source machine, a first function that swaps its identity from the first machine identity to the second machine identity by storing on the source machine an indicator of the second machine identity; and wherein the target machine is configured to execute a second function that swaps its identity from the second machine identity to the first machine identity by storing on the target machine an indication of the first machine identity;

obtain, by the source machine, an upgrade cancellation instruction; and based at least on obtaining the upgrade cancellation instruction:

execute, by the source machine, the first function to revert its identity to the first machine identity by storing on the source machine the indicator of the first machine identity; and wherein the target machine is configured to execute the second function to execute the second function to revert its identity to the second machine identity by storing on the target machine the indicator of the second machine identity.

10. The computer system of claim 9, wherein the first machine identity and the second machine identity each comprises network configuration information, network interface information, and network identity information.

11. The computer system of claim 9, wherein neither the swapping nor the reverting requires use of a user password.

12. The computer system of claim 9, wherein the swapping comprises executing a network interface configuration operation, a host configuration operation, and a network identity setting operation.

13. The computer system of claim 9, wherein the program code is further operative to:

based on at least the source machine obtaining the upgrade cancellation instruction, transmit, by the source machine to the target machine, a cancellation notification using network configuration information of the first machine identity.

14. The computer system of claim 9, wherein the program code is further operative to:

prior to obtaining the first network swap instruction, performing, by the source machine, user operations with an external resource; and after reverting to the first machine identity by the source machine, performing, by the source machine, user operations with the external resource.

15. A non-transitory computer storage medium having stored thereon program code executable by a processor, the program code embodying a method comprising:

based on a first network swap instruction:

obtaining, by a target machine from a source machine, a second network swap instruction, wherein the source machine has a first machine identity and the target machine has a second machine identity;

executing, by the target machine, a second function that swaps its identity from the second machine identity to the first machine identity by storing on the target machine an indicator of the first machine identity;

wherein the source machine is configured to execute a first function that swaps its identity from the first machine identity to the second machine identity by storing on the source machine an indicator of the second machine identity; and obtaining, by the target machine, an upgrade cancellation instruction; and based at least on obtaining the upgrade cancellation instruction:

executing, by the target machine, the second function to revert its identity to the second machine identity by storing on the target machine the indication of the second machine identity; and wherein the source machine is configured to execute the first function to revert its identity to the first machine identity by storing on the source machine an indication of the first identity.

16. The non-transitory computer storage medium of claim 15, wherein the first machine identity and the second machine identity each comprises network configuration information, network interface information, and network identity information.

17. The non-transitory computer storage medium of claim 15, wherein neither the swapping nor the reverting requires use of a user password.

18. The non-transitory computer storage medium of claim 15, wherein the program code method further comprises:

based on at least the target machine obtaining the upgrade cancellation instruction, transmitting, by the target machine to the source machine, a cancellation notification using network configuration information of the second machine identity.

19. The non-transitory computer storage medium of claim 15, wherein the program code is further operative to:

based on at least the target machine completing the swapping from the second machine identity to the first machine identity, transmit, by the target machine, to the source machine, a completion notification using network configuration information of the second machine identity.

20. The non-transitory computer storage medium of claim 15, wherein the program code is further operative to:

after completing the swapping by both the source machine and the target machine and prior to the source machine reverting to the first machine identity, performing, by the target machine, user operations with the external resource.

\* \* \* \* \*